United States Patent [19]

Wiklund

[11] Patent Number: 4,492,471
[45] Date of Patent: Jan. 8, 1985

[54] ARRANGEMENT FOR CHECKING DIMENSIONAL ACCURACY

[75] Inventor: Klas R. Wiklund, Taby, Sweden

[73] Assignee: Pharos AB, Lidingo, Sweden

[21] Appl. No.: 537,329

[22] Filed: Sep. 30, 1983

Related U.S. Application Data

[63] Continuation of Ser. No. 256,908, Apr. 23, 1981, abandoned.

[30] Foreign Application Priority Data

Apr. 23, 1980 [SE] Sweden .................... 8003081

[51] Int. Cl.³ .............. G01B 11/14; G01C 3/02; G02B 5/12; G02F 1/19
[52] U.S. Cl. .................... 356/375; 350/382; 350/396; 356/10
[58] Field of Search ............... 356/9–10, 356/23, 372, 375–376, 394, 401; 250/561; 33/279–280, 288; 350/171, 334, 381–383, 402, 286, 385, 301, 396, 407, 347 R, 347 V

[56] References Cited

U.S. PATENT DOCUMENTS

| | | | |
|---|---|---|---|
| 441,975 | 12/1890 | Rapieff | 33/279 |
| 2,390,652 | 12/1945 | Ives | 356/10 |
| 3,397,608 | 8/1968 | Ellis | 350/396 |
| 3,433,139 | 3/1969 | Beyan et al. | 350/382 |
| 3,710,798 | 1/1973 | Bredemeier | 219/121 LZ |
| 3,765,764 | 10/1973 | Niss | 350/287 |

OTHER PUBLICATIONS

Labrunie et al., "Nematic Liquid Crystal Digital Light Deflector", App. Optics, 8-1974, pp. 1802-1806.

*Primary Examiner*—William H. Punter
*Attorney, Agent, or Firm*—Larson and Taylor

[57] ABSTRACT

An arrangement for checking the dimensional accuracy and/or measuring the dimensions of large objects (1), such as car bodies or the like, where the object is provided with checking points such as bolt heads, suspended measuring rods (2-7). At least one movement path is erected beside the object. Provided on each movement path is at least one transmission unit arranged to move along the path which emits a narrow light beam at an angle to the path. At least two light beams are emitted simultaneously from different starting points towards each checking point. In order to make it possible to clearly detect that both light beams impinge on precisely the same point, the light beams are modulated in different phase positions with a modulation frequency which causes the light upon impingement on one point with only one light beam to be interpreted by the eye as flashing. On the other hand, light at the point of impingement is interpreted as steady if light from both light beams impinge on the point.

9 Claims, 5 Drawing Figures

ARRANGEMENT FOR CHECKING DIMENSIONAL ACCURACY

This is a continuation, of application Ser. No. 256,908 filed Apr. 23, 1981 now abandoned The present invention relates to an arrangement for checking the dimensional accuracy of or measuring the dimensions of large heavy objects such as car bodies.

The modern car with a monocoque body is manufactured in large series with accurate precision. The engine, power transmission, front assembly and rear assembly are fitted more or less directly to the body on reinforcements and brackets welded to the body. The function of the car is highly dependent on that the attachment points, e.g. the steering units for the front and rear assemblies always occupy the positions and have the appearance intended by the manufacturer.

In the event of a collision, the impact forces are frequently propagated into the body shell with residual deformation as a consequence. Without thorough inspection and measurement, it may be difficult to localize any deformations, and this may have a detrimental effect on the driving characteristics of the car. Compensation for minor deformations in the chassis is possible by means of the adjustment facilities incorporated in the front assembly. Under no circumstances, however, is it acceptable for the attachment positions of the front assembly suspension to be "moved" by enlarging bolt holes, etc.

U.S. Pat. No. 3,765,764, discloses an arrangement for checking if a car retains the correct dimensions for the car model concerned, for instance after a collision. The car is hoisted in a device such as a jig or an alignment bench.

The points in a car which are used to check the measurements of the chassis consist of fixture holes and attachment holes for bolts and bolted joints under the car. In order to be able to define these measuring points, use is made of so-called measuring point units which are attached to all relevant checking points in the car chassis. Suspended in each measurement point unit is a ruler which is provided with a millimeter scale and a travelling rider which may be preset at a nominal height level. By reading where a beam of light impinges on the rulers, it is possible to directly determine the height deviations of the chassis. Reflecting colour markings make it easy to check the position of the beam of light on the rulers at a range of several meters.

The light comes from a laser which emits a virtually parallel red beam of light along a lengthwise guide bar. The beam of light strikes a deflection unit where it is divided into two beams perpendicular to each other. One light beam continues along the aforesaid lengthwise guide bar while the other is directed at right angles out from the said guide bar. When the deflection unit which is movable, is moved along the lengthwise guide bar, the perpendicular light beam will also be displaced along the guide bar and impinge on one ruler at a time. The distance between the rulers can then be directly read off on a measuring tape line of roll-up type which is located on the lengthwise guide bar.

In this manner, all the longitudinal and vertical dimensions of the car chassis are measured. In order to measure the width dimensions, the deflection unit is moved to the extreme end of the lengthwise guide bar. The deflection unit now emits a beam of light along the transverse guide bar where measurements are made in the same manner as in the case of the lengthwise guide bar.

If the car needs to be aligned, the operator sets the deflection units on the respective guide bar consecutively in those positions in which they according to the data for the car model concerned are to be placed in order for the light beam normally to impinge on the rulers. If, in any position, the light beam does not then impinge on the ruler concerned, the car is aligned until this occurs.

Since in this known arrangement, only one deflected light beam at a time impinge on each ruler, several realignments may be necessary, particularly when aligning a car, for the same measuring point, i.e. one alignment in the X direction when the deflection unit on the lengthwise guide bar deflects the beam of light towards the measuring point and one alignment in the Y direction when the deflection unit on the crosswise guide bar deflects the beam of light towards the same point. In addition, the alignment in the X direction must be checked and possibly performed again after an alignment in the Y direction. This implies some inconvenience. It would therefore be better if alignment in both the X and the Y direction could be performed simultaneously for each point of measurement.

This problem has been solved in that, in the arrangement according to the present invention, two beams of light are emitted from two different directions, from two separate light transmission units, towards the same point of measurement where this should lie, according to data for the object concerned, during measurement.

When two beams are to be projected onto a point of impingement on e.g. a ruler, it may be difficult to distinguish that both impingement points are actually there.

A very precise indication is obtained if the light from each of the two light transmission units, also referred to as deflection units, is permitted to be switched off and on with a frequency interpreted by the eye as flashing and if the modulation of the light from the two units is allowed to lie out of phase in relation to each other. The light interval may either cover a phase angle of 180° or else the modulation frequency can be selected such that flashings with twice the modulation frequency are interpreted by the eye as steady light. In both cases, the eye discerns very clearly if the beams coming from the deflection units do not impinge on exactly the same point in that the beam on the impingement point then flickers. Only when the two beams of light are exactly set for an impingement on the point does it appear as steady light. When aligning a car, both beams of light are projected onto a point of measurement where, according to data for the car model concerned, this point of measurement should be located, and the car is aligned until the operator sees a non-flickering point of light on the measuring ruler.

BRIEF DESCRIPTION OF THE DRAWINGS

A more detailed description of the invention now follows wherein reference is made to the accompanying drawings in which.

DETAILED DESCRIPTION OF THE PREFERRED EMBODIMENTS

Figure 1:
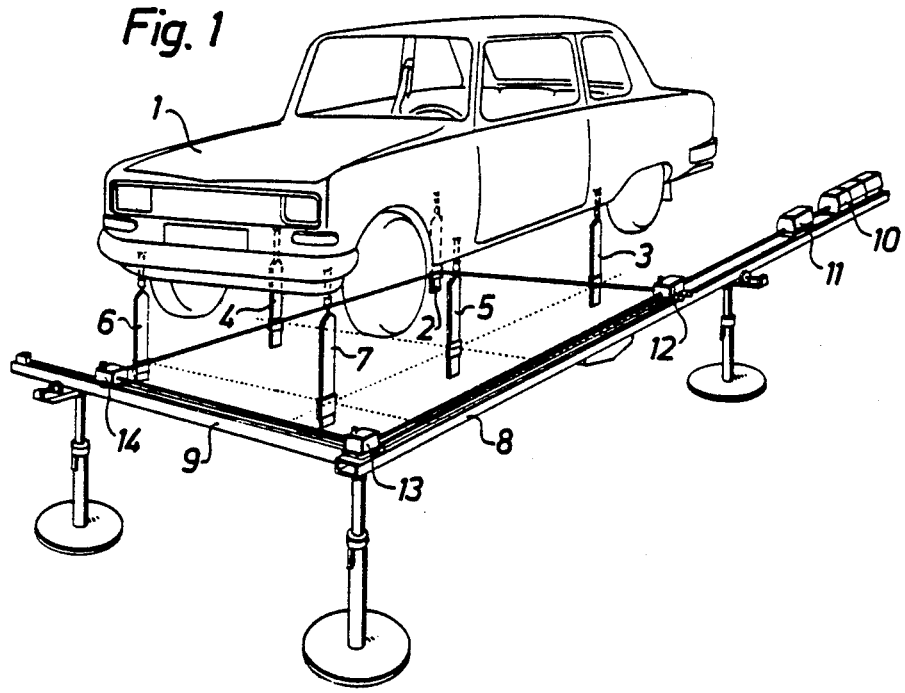
FIG. 1 shows a first embodiment of the arrangement according to the invention.

Shown in FIG. 1 is a first embodiment of an instrument for checking the measurements and giving a correct indication of correct dimensions of a vehicle. The car 1 is hoisted by means of a lifting device (not shown). Rulers 2-7 are attached to suitable measuring points beneath the car 1. These measuring points are in different locations for different car models. Measuring points and dimensions for a standard vehicle of each car model are specified in special measuring records.

Two mutually transverse guide bars 8 and 9 are disposed obliquely below in relation to the hoisted car at a suitable working height for the operator who is, to perform the measurement check. The lengthwise guide bar 8 is located parallel with the longitudinal axis of the vehicle. A light source 10 is fixedly arranged at one end of the guide bar 8. The important feature about the light source is that it shall be able to emit a narrow collimated beam of light in order for impingement on one of the rulers to be clearly discernible by an operator standing at the guide bar. A laser light of the He-Ne type satisfies these requirements.

Located in front of the light source is a unit 11 to accomplish modulation of the light with a frequency such that the light at a point of impingement will appear flashing to an observer. A suitable frequency may lie between 3 and 13 Hz. Suitable modulation devices will be described below.

Shown on the guide bar are two deflection units 12, 13, also referred to as light transmitting units to deflect the light from the laser at a right angle in relation to the guide bar. The unit 12 is capable of being moved along the guide bar 8 and the unit 13 is fixedly located at that end of the guide bar 8 which borders on the guide bar 9. As will be described in greater detail hereinafter, the unit 12 cooperates with the unit 11 so that the unit 12 partially transmits a deflected modulated light beam and partially transmits a light beam straight ahead modulated with the same frequency but in counter-phase to the deflected beam. The unit 13 deflects the light beam along the guide bar 8 so that it goes along the guide bar 9 and is deflected towards the same point of impingement on the measuring ruler 2 as the deflected light beam from the unit 12. If the two light beams were not to impinge on exactly the same point, the operator sees a flickering light from the point. He aligns the vehicle until the point of impingement appears as steady light.

Figure 2:
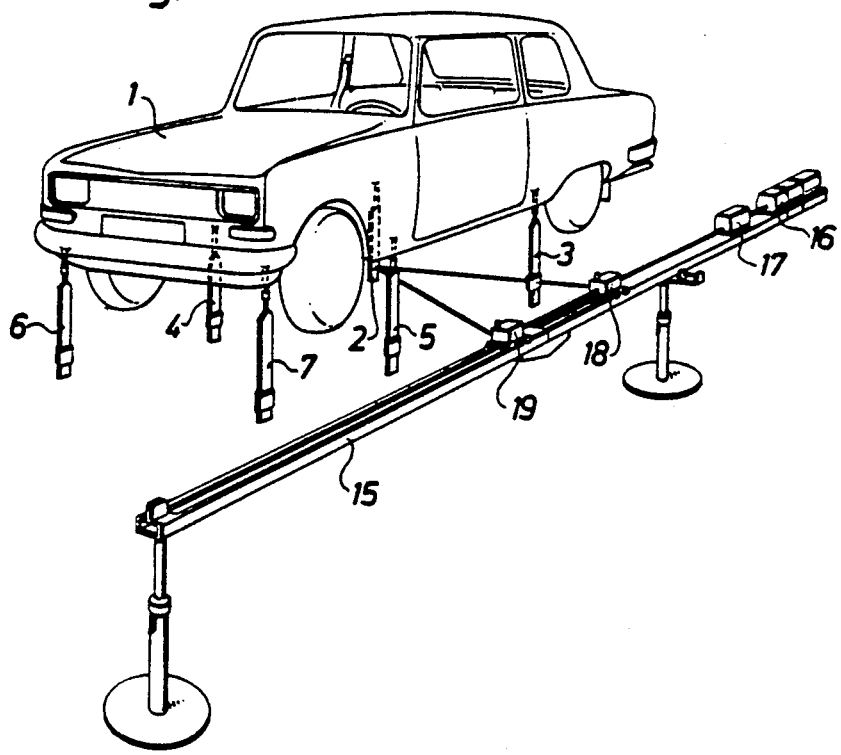
FIG. 2 shows a second embodiment of the arrangement according to the invention.

FIG. 2 shows a second embodiment of an instrument according to the invention in which only one guide bar 15 is arranged at the side of the vehicle to be checked. A light source 16 and a modulation unit 17 are permanently located at one end of the guide bar 15.

Shown on the guide bar are two deflection units 18 and 19 also referred to as light transmitting units, each of which deflects a beam emanating from the light source in the horizontal plane in mutually different directions, so that the ruler 2 is impinged on from two directions. The position of the point of impingement in a guide bar or oriented coordinate system is unambiguously determined by the location along the guide bar of the two deflection units 18 and 19 and the two angles between the deflected light beam from each unit and the distance between the deflection units 18 and 19. In the Figure, the deflected beams are shown to lie in a horizontal plane and to impinge on a point on the ruler in this plane, but it is also possible, instead of suspending rulers at the measuring points on the vehicle to deflect the light beams vertically with the deflection units so that they impinge directly on the different measuring points. This is particularly applicable in those cases when the positions and deflections for the two deflection units are supplied to a central calculation unit which computes data for the vehicle and presents these in a readily discernible manner, for instance on a visual display unit.

Figure 3:
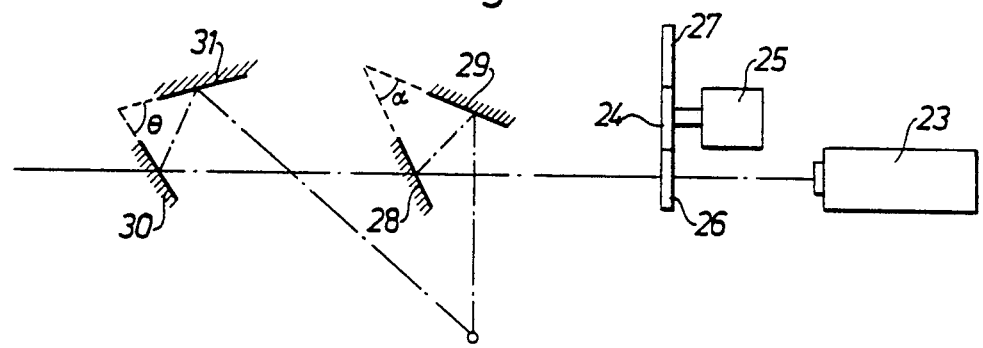
FIG. 3 shows schematically a first embodiment to accomplish modulation of the light.

FIG. 3 shows an embodiment to accomplish modulation of the two light beams. Placed in front of the laser viewed in the direction of the beam is a rotating disc 24 driven by a drive motor 25. This disc comprises a uniform number of sections 26, 27 with polaroids orientated at right angles in relation to each other. These polaroids are appropriately disposed in a ring in the disc 24, each section 26, 27 then occupying alternate locations in the ring. Two deflection units 28, 29 and 30, 31 also referred to as light transmission units are provided on the guide bar. Both have mirrors arranged in analogy with the reflecting surfaces of a pentagon prism. The unit 28, 29 has to accomplish perpendicular deflection of the beam from the laser 23, the angle between the mirrors then being 45°. The unit 30, 31 has to accomplish oblique deflection of the beam from the laser 23 and if this angle is 45°, the angle 0 between the mirrors 30, 31 is 67.5°. By placing the mirrors in the unit in analogy with the reflecting surfaces in a pentagon prism, insensitivity to turning of the slide on the guide bar is obtained.

If, now, the mirror 28 is a polarized mirror, for example with a dicroic coating, which mirror reflects light polarized in one direction and permits light to pass through polarized in another direction, the radiation is reflected by the mirror when polaroids with one orientation of the rotating disc are located in the beam path from the laser and transmitted to the other deflection unit 30, 31 when the other polaroids are in the beam path.

Figure 4:
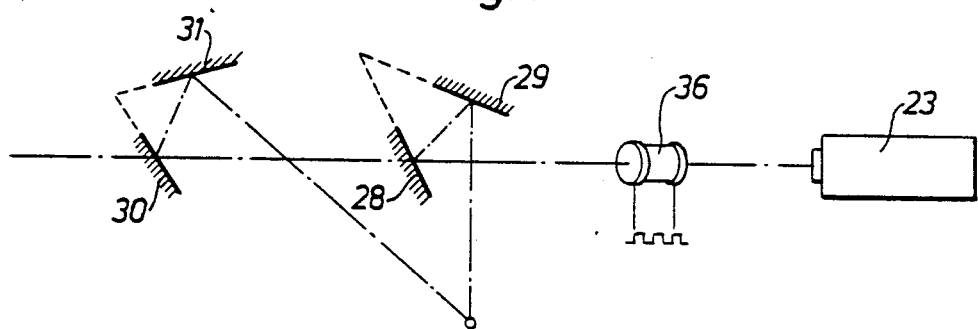
FIG. 4 shows schematically a second embodiment to accomplish light modulation and FIG. 5 shows a third embodiment to accomplish light modulation.

FIG. 4 shows a second embodiment to accomplish modulation of the light beams. The light source and deflection units are identical with those shown in the embodiment according to FIG. 3. In this embodiment, polarization of the light is achieved with a Pockel's cell excited with alternating voltage with a square wave characteristic placed in the beam path in front of the laser 23.

Figure 5:
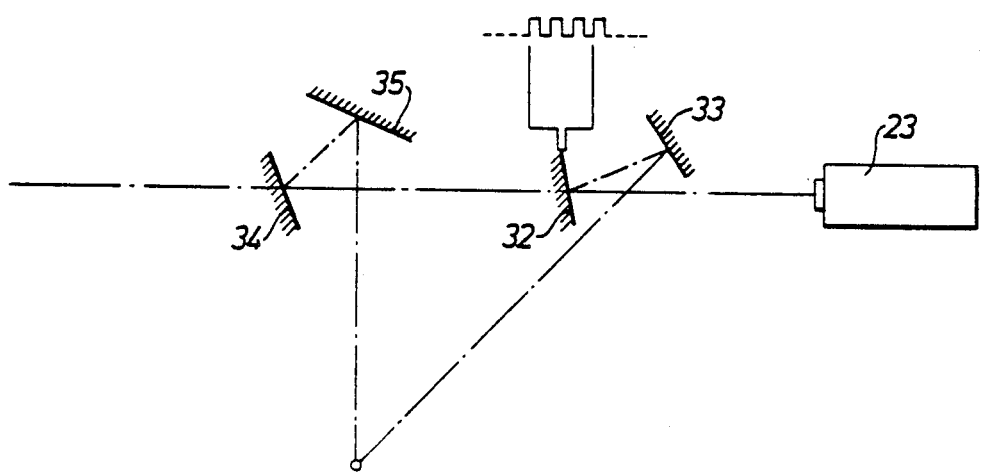

FIG. 5 shows yet another embodiment for accomplishment of modulation of the light beams. A laser 23 projects a light beam along the guide bar. A first deflection unit incorporating two mirrors 32 and 33 located in analogy with the reflecting surfaces in a pentagon prism but with such an angle between the mirrors 32, 33 that the light beam is deflected in an obtuse angle. If the angle between the deflected light beam and the beam is 45°, the angle between the mirrors is 22.5°. A second deflection unit 34, 35, also referred to as a light transmission unit, deflects a light beam projected along the guide bar at a right angle to the guide bar. The mirror 32 in the deflection unit 32, 33 placed closest to the laser 23 incorporates a reflecting layer of liquid crystal with transparent electrodes on both sides. When voltage over a specfic voltage value is applied over the electrodes, the crystals are reflecting. Without applied voltage or with an applied voltage below the said value, the crystals are transparent. Light modulation is accomplished in that a square wave voltage is applied over the electrodes, the said voltage varying between a voltage for the reflecting state and a voltage for the transparent state of the crystals. Another way to describe the flickering action created by the embodiments of FIGS. 3 through 5, as will be apparent from the square voltage pattern described above, is that the light comes on abruptly at the start of the "on" phase, remains on throughout said "on" phase and then abruptly stops upon transition from the "on" phase to the "off" phase, and remains off during the "off" phase.

Several modifications are possible within the scope of the invention. For example, the rotating disc in FIG. 3 may be replaced by a reciprocating device which alternately introduces polaroids wit mutually perpendicular orientation. It is also possible, instead of arranging deflection units cooperating with a laser, to equip each transmission unit 12, 14, 18, 19 with its own light source and to modulate these sources directly.

I claim:

1. A dimensional checking apparatus for checking the dimensions of large, heavy, elongate objects such as automobile bodies, each object being provided with a plurality of checking points spaced along the length and width thereof and being mounted on a device such as a jig or alignment bench, the apparatus comprising:
   a plurality of graduated rulers, each ruler mountable at a corresponding checking point;
   at least one measuring guide bar having a length that is at least substantially the length of the object;
   means for positioning said at least one guide bar parallel to the longitudinal axis of said object;
   a source of a visible light beam fixedly mounted to said bar, said source emitting said light beam parallel to said bar;
   at least two directing means longitudinally, adjustably mounted on said bar for receiving and directing at least a portion of said beam of light, each directing means for directing said beam of light at the same selectable one of said rulers at known angles with respect to said guide bar, but from different points on said guide bar, each directing means having an indicatable position on said guide bar;
   a modulating means to modulate said light beams with mutually different phases at a modulation frequency, said modulating means including means for causing each beam to abruptly commence transmission of light toward the object at the start of its on phase, and for causing said beam to remain on during its on phase, and for abruptly stopping light transmission at the commencement of its off phase, and for causing said beam to remain off during its off phase, wherein, light incident upon a point from only one light beam is seen to be flickering, while a steady light is seen if that point has more than one light beam incident thereon.

2. An apparatus according to claim 1 characterized in that said light source is located at one end of said at least one guide bar and is arranged to project a light beam to two separate beam directing means, the directing means which is first in the path of the beam incorporating a selective mirror which alternately reflects and transmits the light beam.

3. An apparatus according to claim 2, characterized in that said modulating means comprises a modulator located in the beam path after the light source which makes a polarization alternatingly with said modulation frequency in two different intersecting polarization directions of said light beam emitted from said light source, and in that said selective mirror is a polarized semi-transparent mirror.

4. An apparatus according to claim 3, characterized in that said modulator comprises a rotating disc containing a ring of polaroids oriented alternately in mutually intersecting directions, and in that the rotating disc is located to have a part of said ring intersecting said light beam.

5. An apparatus according to claim 3, characterized in that said modulator comprises a Pockel's cell located on the optical axis of the light beam and excited by alternating voltage applied to its electrodes.

6. An apparatus according to claim 2, characterized in that said selective mirror comprises a mirror element with a liquid crystal cell and a voltage is applied via the cell electrodes, which voltage varies between a value where said mirror element is in a transparent state and a value where said mirror element is in a reflecting state.

7. An apparatus according to claim 1 and further including
   a second measuring guide bar mounted at a known angle to said one guide bar and extending transversely therefrom, the object being checked being locatable in said angle therebetween; and
   wherein said directing means that is not first in the beam path is comprised of a first beam directing unit adjustably mounted on said second guide bar and for directing said beam at the same selectable one of said rulers at a known angle with respect to said second guide bar, and a second beam directing unit rigidly mounted to said one guide bar for redirecting said beam to said first beam directing unit.

8. An apparatus according to claim 7 wherein said one guide bar and said second guide bar are connected together and said second beam directing unit is located at said intersection.

9. An apparatus according to claim 8 wherein said second guide bar has a length that is at least substantially the width of the object and extends perpendicularly from said one guide bar.

* * * * *